US010544731B1

(12) United States Patent
McKinney et al.

(10) Patent No.: US 10,544,731 B1
(45) Date of Patent: Jan. 28, 2020

(54) NITROUS OXIDE INJECTION

(71) Applicants: Christopher R. McKinney, Port Charlotte, FL (US); Rob Crain, Port Charlotte, FL (US)

(72) Inventors: Christopher R. McKinney, Port Charlotte, FL (US); Rob Crain, Port Charlotte, FL (US)

( * ) Notice: Subject to any disclaimer, the term of this patent is extended or adjusted under 35 U.S.C. 154(b) by 183 days.

(21) Appl. No.: 15/690,575

(22) Filed: Aug. 30, 2017

Related U.S. Application Data

(60) Provisional application No. 62/381,476, filed on Aug. 30, 2016.

(51) Int. Cl.
| | | |
|---|---|---|
| *F02B 43/10* | (2006.01) | |
| *F02M 37/00* | (2006.01) | |
| *F02D 19/08* | (2006.01) | |
| *F02D 41/30* | (2006.01) | |
| *F02M 35/10* | (2006.01) | |
| *F02D 9/10* | (2006.01) | |
| *F02D 11/10* | (2006.01) | |

(52) U.S. Cl.
CPC .............. *F02B 43/10* (2013.01); *F02D 9/105* (2013.01); *F02D 11/10* (2013.01); *F02D 19/08* (2013.01); *F02D 41/3017* (2013.01); *F02M 35/1038* (2013.01); *F02M 37/0088* (2013.01); *F02D 2200/101* (2013.01)

(58) Field of Classification Search
CPC .......... F02B 43/10; F02D 11/10; F02D 9/105; F02D 19/08; F02D 41/3017; F02D 2200/101; F02M 35/1038; F02M 37/0088
See application file for complete search history.

(56) References Cited

U.S. PATENT DOCUMENTS

| | | | | |
|---|---|---|---|---|
| 5,287,281 A | * | 2/1994 | Meaney ................ | B60K 28/16 123/1 A |
| 6,260,546 B1 | * | 7/2001 | Vaughn .................. | F02B 47/02 123/297 |
| 2007/0137620 A1 | * | 6/2007 | Couch .................... | F02D 41/20 123/490 |
| 2013/0080008 A1 | * | 3/2013 | Tanaka ................... | F16H 61/12 701/62 |
| 2013/0098201 A1 | * | 4/2013 | Suzuki ................... | F16H 37/06 74/665 F |
| 2014/0060492 A1 | * | 3/2014 | Woolvett ............... | F02D 19/06 123/478 |

* cited by examiner

*Primary Examiner* — Jacob M Amick
*Assistant Examiner* — Charles Brauch
(74) *Attorney, Agent, or Firm* — John Rizvi; John Rizvi, P.A.—The Patent Professor ®

(57) ABSTRACT

Implementations are disclosed herein that relate to a nitrous oxide (NOS) injection system. An example provides an engine control unit (ECU) comprising a logic machine and a storage machine holding instructions executable by the logic machine to selectively enable NOS injection from a NOS reservoir into an engine based on engine temperature, operational transmission gear ratio, barometric pressure, NOS reservoir pressure, engine speed, and intake throttle position.

16 Claims, 3 Drawing Sheets

NITROUS OXIDE INJECTION

CROSS-REFERENCE TO RELATED APPLICATION

This application claims the benefit of U.S. Provisional Patent Application Ser. No. 62/381,476, filed Aug. 30, 2016, which is incorporated herein in its entirety.

FIELD OF THE INVENTION

The present invention relates generally to an internal combustion engine, and more particularly to nitrous oxide boosting in an internal combustion engine.

BACKGROUND OF THE INVENTION

Various approaches to increasing the performance and output of an internal combustion engine (ICE) have been developed. One such approach includes injecting nitrous oxide (NOS) into the intake system of an engine to increase engine output. NOS injection may be performed in a variety of contexts, such as industrial and racing settings, for example.

In a typical implementation for performing NOS injection in an ICE, a pressurized reservoir is used to store NOS, whose pressure inside the reservoir is monitored by a pressure gauge. A high pressure line connects the reservoir to an electronic solenoid, which may be operated by a switch that is actuated according to intake throttle position, or via manual control applied by a vehicle operator. Another high pressure line connects the solenoid to an injector that is mounted in the engine intake system and which may have a high tolerance orifice for injecting NOS. The size of the orifice may at least partially determine the additional engine output afforded by NOS injection. To avoid undesired (e.g., lean) operation, additional amounts of a fuel (e.g., gasoline, diesel) with which the engine is designed to operate may be injected in approximate proportion to the amount of NOS injected. The injection of additional nominal fuel may be carried out in various suitable manners, using a so-called "wet" or "dry" injection system. In a wet injection system, a secondary fuel system introduces added fuel that accompanies NOS, whereas in a dry injection system, an existing fuel system (e.g., factory-installed) is utilized to add fuel.

The results of NOS injection may vary greatly with a variety of engine operating and environmental variables. Consequently, performing NOS injection in certain variable ranges, and/or without consideration of some variables, can result in undesired or degraded engine operation. Further, the difficulty of installing a NOS injection system that provides both desired NOS boosting and engine operation may be exacerbated by its typically aftermarket nature; being an aftermarket part, installation is typically carried out by a vehicle operator or third-party establishment (e.g., auto body shop), both of which are typically relegated to adapting an existing engine control unit (ECU) to the NOS injection system. Lacking the ability to design an ECU for compatibility with NOS boosting, modifications to the existing (e.g., factory-installed) ECU may be performed and/or new components added (e.g., fuel control components, switches), which may introduce potential points of degradation.

As such, there exists a need for an integrated NOS injection system in which a variety of operating and environmental variables can be processed at a common ECU and used to control NOS injection.

SUMMARY OF THE INVENTION

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

According to embodiments of the present disclosure, a nitrous oxide (NOS) injection system is disclosed.

In another aspect, an engine control unit (ECU) evaluates engine temperature to selectively control NOS injection.

In another aspect, the ECU evaluates the operational gear ratio of a transmission to selectively control NOS injection.

In another aspect, the ECU evaluates barometric pressure to selectively control NOS injection.

In another aspect, the ECU evaluates NOS reservoir pressure to selectively control NOS injection.

In another aspect, the ECU evaluates engine speed to selectively control NOS injection.

In another aspect, the ECU evaluates intake throttle position to selectively control NOS injection.

Further, disclosed is a system, comprising: an internal combustion engine configured to run on a design fuel, a fuel system including, a fuel reservoir configured to store the design fuel, and a nitrous oxide (NOS) reservoir configured to store NOS, an engine control unit configured by a manufacturer of the engine control unit to selectively cause injection of the NOS into the internal combustion engine responsive to identifying, based on two or more sensor inputs, an operating condition in which NOS injection is permitted, to thereby boost output of the internal combustion engine.

In another aspect, the NOS reservoir is one of a plurality of components of a NOS injection system, the NOS injection system is an aftermarket part, and the engine control unit is a non-aftermarket part.

In another aspect, the fuel system further includes a solenoid valve, and wherein the engine control unit is further configured to cause injection of the NOS by causing actuation of the solenoid valve.

In another aspect, the system further comprises a switch operatively coupled to the engine control unit, wherein the engine control unit is further configured to selectively cause injection of the NOS further responsive to closing of the switch, and to disable injection of the NOS responsive to opening of the switch, the switch being operatively coupled to a mechanism that is manually actuatable by a vehicle operator to open or close the switch.

In another aspect, the ECU uses a first fuel/ignition timing table for an operating condition in which NOS injection is disabled, and uses a second fuel/ignition timing table for the operating condition in which NOS injection is permitted.

In another aspect, the second fuel/ignition timing table specifies an amount of the design fuel for injection that adapts to a variable amount of the NOS drawn from the NOS reservoir.

In another aspect, the engine control unit is further configured to identify a NOS off condition, and responsive to identifying the NOS off condition, exit the second fuel/ignition timing table following expiration of a timer and return to the first fuel/ignition timing table.

In another aspect, the two or more sensor inputs include a temperature of the internal combustion engine sensed by a temperature sensor, and wherein the operating condition includes the temperature being greater than a minimum temperature and less than a maximum temperature.

In another aspect, the system further comprises a transmission, wherein the two or more sensor inputs include an operational gear ratio of the transmission sensed by a gear sensor, and wherein the operating condition includes one or both of the operational gear ratio being greater than a minimum gear ratio and less than a maximum gear ratio.

In another aspect, the system further comprises a NOS reservoir sensor, an intake passage pneumatically coupled to the internal combustion engine, and a pressure sensor arranged in the intake passage, wherein the two or more sensor inputs include a pressure in the NOS reservoir sensed by the NOS reservoir sensor and a barometric pressure sensed by the pressure sensor, and wherein the operating condition includes the pressure in the NOS reservoir being less than a maximum pressure in the NOS reservoir relative to the barometric pressure.

In another aspect, the system further comprises an intake passage pneumatically coupled to the internal combustion engine, and a pressure sensor arranged in the intake passage, wherein the two or more sensor inputs include a barometric pressure sensed by the pressure sensor, and wherein the engine control unit is further configured to throttle NOS injection as the barometric pressure increases.

In another aspect, the two or more sensor inputs include a speed of the internal combustion engine sensed by an engine speed sensor, and wherein the operating condition includes the speed being greater than a minimum engine speed and less than a maximum engine speed.

In another aspect, the system further comprises an intake passage pneumatically coupled to the internal combustion engine, and an intake throttle arranged in the intake passage and having an internal throttle position sensor, wherein the two or more sensor inputs include a throttle position of the intake throttle sensed by the throttle position sensor, and wherein the operating condition includes the throttle position being greater than a minimum throttle position.

Further disclosed is an internal combustion engine configured to run on a design fuel, a nitrous oxide (NOS) injection system including a NOS reservoir configured to store NOS, a fuel reservoir configured to store the design fuel, and an engine control unit configured by a manufacturer of the engine control unit to, receive a plurality of sensor inputs, identify, based on two or more of the sensor inputs, an operating condition in which NOS injection is permitted, and responsive to identifying the operating condition in which NOS injection is permitted, cause injection of the NOS into the internal combustion engine to thereby boost output of the internal combustion engine, wherein the two or more sensor inputs include two or more of a barometric pressure, a pressure of the NOS reservoir, a speed of the internal combustion engine, and a temperature of the internal combustion engine.

In another aspect, the NOS injection system is an aftermarket part, and the engine control unit is a non-aftermarket part.

In another aspect, the system further comprises a switch operatively coupled to the engine control unit, wherein the engine control unit is further configured to cause injection of the NOS further responsive to closing of the switch, and to disable injection of the NOS responsive to opening of the switch, the switch being operatively coupled to a mechanism that is manually actuatable by a vehicle operator to open or close the switch.

In another aspect, the operating condition includes: the temperature being greater than a minimum temperature and less than a maximum temperature, the pressure in the NOS reservoir being less than a maximum pressure in the NOS reservoir relative to the barometric pressure, and the speed being greater than a minimum engine speed and less than a maximum engine speed.

In another aspect, the system further comprises: an intake passage pneumatically coupled to the internal combustion engine, an intake throttle arranged in the intake passage and having an internal throttle position sensor, a transmission, and a gear sensor, wherein the two or more sensor inputs further include a throttle position of the intake throttle sensed by the throttle position sensor, and an operational gear ratio of the transmission sensed by the gear sensor, and wherein the operating condition includes, the throttle position being greater than a minimum throttle position, and the operational gear ratio being greater than a minimum gear ratio and less than a maximum gear ratio.

Further disclosed is an engine control unit, comprising, a logic machine, and a storage machine holding instructions executable by the logic machine to selectively enable nitrous oxide (NOS) injection from a NOS reservoir of a NOS injection system into an engine based on engine temperature, operational transmission gear ratio, barometric pressure, NOS reservoir pressure, engine speed, and intake throttle position, wherein the NOS injection system is an aftermarket part, and wherein the instructions are installed on the engine control unit by a manufacturer of the engine control unit.

In another aspect, the instructions are executable to enable NOS injection responsive to, the temperature being greater than within 10% of 60 degrees Celsius and less than within 10% of 90 degrees Celsius, the operational transmission gear ratio being greater than a first gear and less than an upper gear, the NOS reservoir pressure being less than between 0 and within 10% of 350 psi relative to the barometric pressure, the barometric pressure being greater than within 10% of 87.5 kPA for an elevation within 10% of 4000 feet, the engine speed being greater than within 10% of 6500 RPM and less than within 10% of 10,500 RPM, and the intake throttle position being greater than within 100% of 70% fully open.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Disclosed is a nitrous oxide (NOS) injection system. An example provides an engine control unit (ECU) comprising a logic machine and a storage machine holding instructions executable by the logic machine to selectively enable NOS injection from a NOS reservoir into an engine based on engine temperature, operational transmission gear ratio, barometric pressure, NOS reservoir pressure, engine speed, and intake throttle position.

Figure 1:
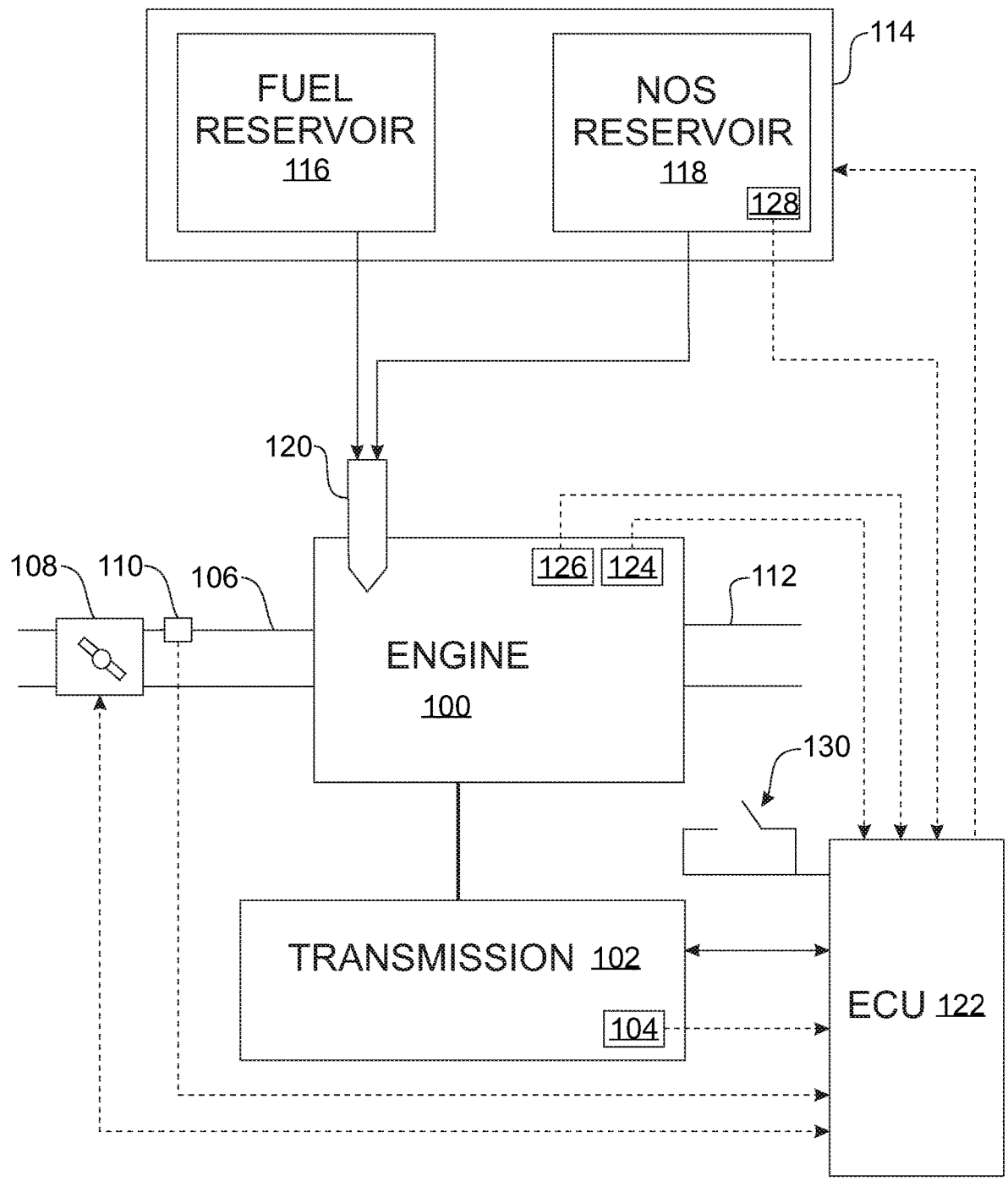
FIG. 1 presents an exemplary engine.

The illustration of FIG. 1 schematically presents an exemplary engine 100, which may be included in the propulsion system of a vehicle. Engine 100 may assume any suitable form such as that of an internal combustion engine (ICE), and may comprise any suitable number of cylinders in various arrangements (e.g., I-4, V6, V8, V12). While not shown in the illustration of FIG. 1, in some examples engine 100 may be assisted by an electrical system comprising an energy source (e.g., battery) and a motor operatively coupled to one or more wheels of a vehicle in which the engine may be implemented. Such a configuration may be referred to as a "hybrid" configuration, and may employ techniques such as regenerative braking to charge the energy source.

The cylinders of engine 100 may include pistons that can be driven by fuel combustion therein to produce reciprocating piston motion. The reciprocating piston motion may be converted to rotational motion of a crankshaft, which may be coupled to one or more vehicle wheels via a transmission 102 to thereby provide vehicle propulsion. Transmission 102 may assume any suitable form, including automatic and manual configurations, and may include one or more gear ratios. A gear sensor 104 may be provided to sense the instant gear ratio in which transmission 102 is operating.

An intake passage 106 may be pneumatically coupled to engine 100 to provide intake air to the engine which can be mixed with fuel to thereby form charge air for in-cylinder combustion. An intake throttle 108 may be arranged in intake passage 106 and configured to variably control the air ingested into engine 100—e.g., as a function of mass airflow, volume, pressure. Intake passage 106 may include a pressure sensor 110 configured to sense barometric pressure in the surrounding vehicle environment. Intake passage 106 may include various components not shown in the illustration of FIG. 1, including but not limited to a charge air cooler, a compressor (e.g., of a turbocharger or supercharger), an intake manifold, etc. While also not shown in the illustration of FIG. 1, respective intake valves may variably control the ingestion of charge air into one or more cylinders of engine 100.

An exhaust passage 112 may be pneumatically coupled to engine 100 to provide a path by which the products of charge air combustion are exhausted from the engine and to the surrounding vehicle environment. While not shown in the illustration of FIG. 1, various aftertreatment devices may be arranged in exhaust passage 112 to treat exhaust gasses, including but not limited to a NOx trap, particulate filter, catalyst, etc. For implementations in which engine 100 is boosted via a turbocharger, a turbine may be arranged in exhaust passage 112 to drive the turbocharger compressor. While also not shown in the illustration of FIG. 1, respective exhaust valves may variably control the expulsion of exhaust gasses from one or more cylinders of engine 100.

A fuel system 114 may be configured to deliver fuel to engine 100 for mixing with intake air to form charge air that can be combusted therein. Fuel system 114 may include a fuel reservoir 116 configured to store a so-called "nominal" or "design" fuel on which engine 100 may have been designed to operate (e.g., gasoline, diesel, ethanol, natural gas). Fuel system 114 may further include a NOS reservoir 118 configured to store NOS, which can be selectively injected into engine 100 (e.g., along with fuel drawn from reservoir 116) to boost engine output. The illustration of FIG. 1 shows the supply of fuel from reservoirs 116 and 118 to a fuel injector 120, which may be arranged in various suitable locations such as an intake manifold or a cylinder. While not shown in the illustration of FIG. 1, fuel system 114 may include various components including but not limited to a fuel rail, pumps, filters, meters, etc. A solenoid valve, for example, may be actuated to selectively allow the supply of NOS from NOS reservoir 118 to fuel injector 120.

An engine control unit (ECU) 122 may be operatively coupled to various components for receiving sensor input, actuating devices, and generally effecting the approaches described herein. As examples, ECU may receive one or more of the following inputs: an indication of throttle position from intake throttle 108, an indication of barometric pressure from pressure sensor 110, an indication of the operating gear of transmission 102 from gear sensor 104, an indication of the temperature of engine 100 from a temperature sensor 124, an indication of the speed of engine 100 (e.g., as a measurement of crankshaft RPM) from an engine speed sensor 126, and/or an indication of the pressure of NOS reservoir 118 from a NOS reservoir sensor 128. As described in further detail below, one or more of these sensor inputs, among other potential inputs, may be used to generally operate engine 100 and/or other components shown in the illustration of FIG. 1, and more particularly to control NOS injection from NOS reservoir 118.

ECU 122 may actuate one or more components shown in the illustration of FIG. 1. Such actuation may be performed based on one or more of the inputs described above, among other potential inputs. As examples, ECU 122 may control the throttle position of intake throttle 108 (e.g., based in part on the throttle position input to achieve a desired load on engine 100), the operating gear ratio of transmission 102 (e.g., based in part on the instant gear ratio input to achieve a desired RPM range of the engine), the operation of injector 120, and/or the supply of fuels from reservoirs 116 and 118 by controlling one or more components of fuel system 114. Generally, ECU 122 may coordinate the operation of a variety of components (e.g., fuel injection, throttle position, valve timing) to achieve desired output of engine 100 that is commensurate with vehicle operator input (e.g., pedal position). As additional examples, ECU may cause actuation of a solenoid valve, spark or glow plugs, transmission 102, a compressor, aftertreatment device(s), etc.

ECU 122 may be implemented in various suitable manners. As an example, ECU 122 may include a logic machine and a storage machine holding instructions executable by the logic machine to effect the approaches described herein. The logic machine may be implemented as a controller, processor, system-on-a-chip (SoC), etc. The storage machine may be implemented as read-only memory (ROM, such as electronically-erasable-programmable ROM), and may comprise random-access memory (RAM). ECU 122 may include an input/output (I/O) interface for receiving inputs and issuing outputs (e.g., control signals for actuating components).

As described above, ECU 122 may control the injection into engine 100 of NOS stored in NOS reservoir 118. To address the issues described above, ECU 122 is configured to consider a variety of inputs in controlling NOS injection, thereby providing a consolidated point of input processing and control of NOS injection that does not relegate vehicle operators or other users to installing additional components that distribute NOS injection control across multiple devices. As described below, ECU 122 may selectively cause injection of NOS into engine 100 responsive to identifying, based on one or more sensor inputs enumerated below, an operating condition in which NOS injection is permitted, to thereby boost output of the engine. An operating condition that enables NOS injection may include one or more sub-operating conditions. If such an operating condition is not identified, NOS injection may be disabled. In this way, ECU 122 may selectively perform NOS injection.

In some examples, ECU 122 may be configured to provide consolidated control of the NOS injection system and of engine 100 as described herein by a manufacturer of the ECU (who, in some examples, may also manufacture the engine and/or a vehicle in which it is provided). More specifically, instructions (described below) executable to effect the NOS control routines described herein may be installed by the ECU manufacturer during manufacture, and as such may be referred to as "factory-installed". The ECU manufacturer may also endow ECU 122 with physical hardware that enables the NOS control routines described herein, such as input and/or output ports for receiving sensor inputs used in the NOS control routines and/or for providing signals that actuate the NOS injection system. In some examples and in contrast to ECU 122, the NOS injection system may be an aftermarket part. For example, the NOS injection system may be installed in a vehicle by an entity other than a manufacturer of the vehicle and/or ECU 122, and may be installed after manufacture of the vehicle and/or ECU. However, in other examples ECU 122 may be an aftermarket part (e.g., that replaces an original, factory-installed ECU).

ECU 122 may evaluate the temperature of engine 100 in controlling NOS injection. The temperature of engine 100 may be assessed based on input from temperature sensor 124. ECU 122 may control NOS injection based on engine temperature such that NOS injection is allowed in response to engine temperature being in an operating temperature range, among other variables that are considered. More particularly, ECU 122 may evaluate whether engine temperature is greater than a minimum temperature (e.g., 60° C.) and below a maximum temperature (e.g., 90° C.), and may allow NOS injection if this condition is met and disallow NOS injection if both conditions are not met.

ECU 122 may evaluate the operational gear ratio of transmission 102 in controlling NOS injection. The operational gear ratio of transmission 102 may be assessed based on input from gear sensor 104. At lower loads, engine 100 may rapidly approach a rev limiter upon receiving injected NOS. At a first gear ratio of transmission 102, for example, NOS injection could cause engine 100 to exceed the rev limiter, potentially resulting in degradation of the engine (e.g., at the valvetrain). As such, ECU 122 may evaluate whether the operational gear ratio of transmission 102 is greater than a minimum (e.g., first) gear, and may allow NOS injection if this condition is met and disallow NOS injection if this condition is not met. ECU 122 alternatively or additionally may evaluate whether the operational gear ratio of transmission 102 is less than a maximum or upper gear ratio, and may allow NOS injection if this condition is met and disallow NOS injection if this condition is not met.

ECU 122 may evaluate the pressure in NOS reservoir 118 in controlling NOS injection. The pressure in NOS reservoir 118 may be assessed based on input from NOS reservoir sensor 128. The added power afforded by NOS injection may vary significantly with the pressure in NOS reservoir 118. For example, a vehicle that is configured to inject NOS for a 20 hp boost with NOS pressure at 350 psi may instead experience a 35 hp boost if the NOS pressure rises to 450 psi, which could result in degradation of engine 100. Unplanned or unmonitored changes in NOS reservoir pressure may occur in the course of normal vehicle operation—for example, as the vehicle spends increasing time in an outdoor environment and cools or heats toward outdoor temperatures. Further, existing approaches to maintaining NOS reservoir pressure in a desired range may be infeasible for some vehicle types and/or operating conditions, such as snow vehicles for which a sufficient power source cannot be provided to a warming system at low temperatures and/or NOS pressures. As such, ECU 122 may evaluate whether the pressure in NOS reservoir 118 is less than a maximum NOS reservoir pressure relative to barometric pressure—e.g., whether NOS pressure is between 0 and 350 psi relative to barometric pressure. ECU 122 may allow NOS injection if this condition is met and disallow NOS injection if this condition is not met.

ECU 122 may evaluate barometric pressure in controlling NOS injection. Barometric pressure may be assessed based on input from pressure sensor 110. The output (e.g., power) of engine 100 may vary with barometric pressure due to the volatility in available oxygen. An engine configured to output 100 hp at sea level may instead output approximately 70 hp at 10,000 feet, for example. As such, ECU 122 may evaluate barometric pressure such that boosts in output power afforded by NOS injection do not combine with the output power afforded by the combustion of design fuel in engine 100 to exceed a maximum design output of the engine. Generally, ECU 122 may throttle NOS injection with increasing barometric pressure as oxygen becomes more available and the combustion of design fuel affords increasing levels of output power. In particular, ECU 122 may evaluate, potentially as a function of elevation, whether barometric pressure is greater than a minimum barometric pressure (e.g., a typical or average barometric pressure at 4000 ft, such as 87.5 kPa), and may allow NOS injection if this condition is met and disallow NOS injection if this condition is not met. ECU 122 alternatively or additionally may evaluate whether barometric pressure is less than a maximum barometric pressure (e.g., a typical or average barometric pressure at 14,000 ft, such as 60 kPa), and may allow NOS injection if this condition is met and disallow NOS injection if this condition is not met.

ECU 122 may evaluate the speed of engine 100 in controlling NOS injection. The speed of engine 100 may be assessed based on input from engine speed sensor 126. In some operating ranges in which the load on engine 100 is relatively high and engine speed relatively low, NOS injection can cause excessively rapid increases in cylinder pressure, which may lead to engine degradation—e.g., degradation of connecting rods that couple the pistons to a crankshaft. As such, ECU 122 may evaluate whether engine speed is greater than a minimum engine speed (e.g., 6500 RPM) and below a maximum engine speed (e.g., 10,500 RPM), and may allow NOS injection if this condition is met and disallow NOS injection if both conditions are not met.

ECU 122 may evaluate the throttle position of intake throttle 108 in controlling NOS injection. The throttle position of intake throttle 108 may be assessed based on input from the intake throttle (e.g., via an internal throttle position sensor). Throttle position may be assessed to avoid NOS injection at relatively high engine load/relatively low engine speed, for example. In particular, ECU 122 may evaluate whether the throttle position is greater than a minimum throttle position (e.g., greater than 70% of fully open). ECU 122 may allow NOS injection if this condition is met and disallow NOS injection if this condition is not met.

The illustration of FIG. 1 shows the potential inclusion of a switch 130 operatively coupled to ECU 122, that when closed, may arm the NOS injection system. For example, closing of switch 130 may prompt ECU 122 to enter an operational mode in which one or more of the conditions described above are evaluated to selectively allow or disallow NOS injection into engine 100. ECU 122 may persist in this operational mode while switch 130 is closed, for example. Switch 130 may be operatively coupled to a mechanism that can be manually actuated by a vehicle operator (e.g., toggle, button, knob), for example, so that the vehicle operator can open or close the switch and thereby selectively enable or disable the NOS injection system. As used herein, "NOS injection system" may refer to one or more of a plurality of components comprising the NOS injection system, including but not limited to NOS reservoir 118; NOS reservoir sensor 128; the solenoid valve described above; switch 130; and ECU 122 or a portion thereof, including one or more hardware and/or software components of the ECU, such as a collection of instructions stored on and executable the ECU to effect the control routines of the NOS injection system described herein.

ECU 122 may comprise various fuel/ignition timing tables which may be employed in response to various operating conditions. For example, ECU 122 may employ a first fuel/ignition timing table with NOS injection disabled, and may employ a second fuel/ignition timing table with NOS injection enabled. The fuel/ignition timing tables may stipulate ignition timings, fueling timings, valve timings, fueling amounts, etc. The second fuel/ignition timing table may stipulate the injection of fuel from fuel reservoir 116 in amounts that adapt to the variable injection of NOS drawn from NOS reservoir 118, for example. In particular, the second fuel/ignition timing table may specify an amount of the design fuel for injection that adapts to a variable amount of the NOS drawn from the NOS reservoir, where ECU 122 may determine the variable amount based a variety of sensor inputs as described herein.

It will be understood that the illustration of FIG. 1 is exemplary and is not intended to exhaustively show each and every component of an engine, vehicle, NOS injection system, or other apparatus. Alternative or additional components other than those shown in the illustration of FIG. 1 may be used to implement the approaches described herein as will be recognized by those of ordinary skill in the art. Further, the numerical quantities and ranges described herein are not limiting may be adjusted without departing from the scope of this disclosure.

Figure 2A:
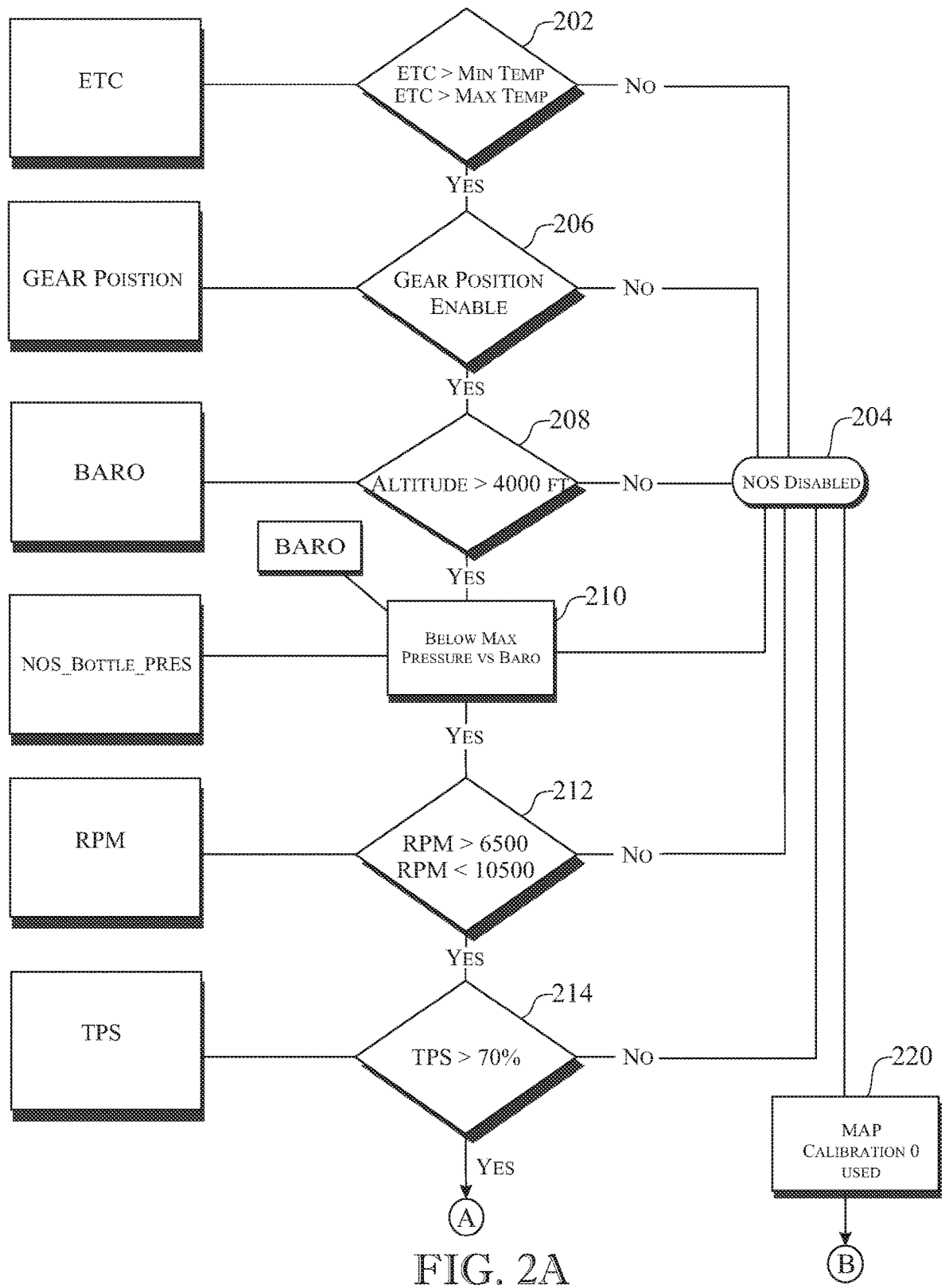
FIGS. 2A and 2B present a flowchart illustrating an exemplary method of injecting nitrous oxide in an internal combustion engine.
Figure 2B:
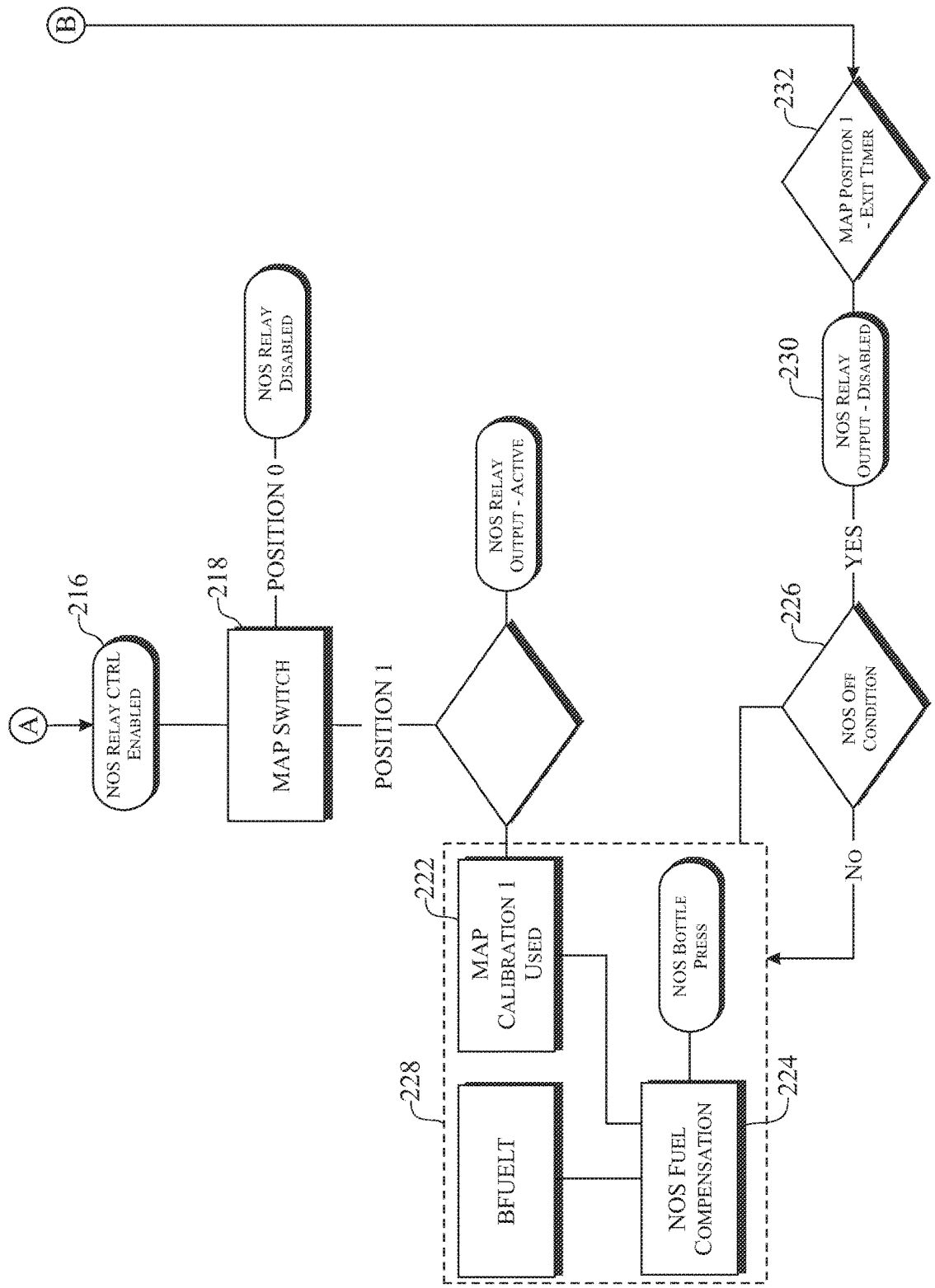

The illustrations of FIGS. 2A and 2B present a flowchart illustrating an exemplary method 200 of injecting NOS in an ICE. Method 200 may be implemented in instructions stored on a storage machine of ECU 122 that are executable by the logic machine of the ECU. As such, method 200 may be employed to control NOS injection into engine 100, for example. References to the illustration shown in FIG. 1 are thus made throughout.

At 202, method 200 comprises determining whether engine temperature is greater than a minimum engine temperature and less than a maximum engine temperature. Engine temperature may be assessed based on input from temperature sensor 124, for example. If the engine temperature is not greater than the minimum engine temperature and less than the maximum engine temperature (NO), NOS injection is disabled at 204. If the engine temperature is greater than the minimum engine temperature and less than the maximum engine temperature (YES), method 200 proceeds to 206. The minimum temperature may be 60° C., and the maximum temperature may be 90° C., for example.

At 206, method 200 comprises determining whether the operational gear ratio of a transmission is greater than a minimum operational gear ratio and less than a maximum operational gear ratio. The operational gear ratio of the transmission may be assessed based on input from gear sensor 104, for example. If the operational gear ratio is not greater than the minimum operational gear ratio and less than the maximum operational gear ratio (NO), NOS injection is disabled at 204. If the operational gear ratio is greater than the minimum operational gear ratio and less than the maximum operational gear ratio (YES), method 200 proceeds to 208.

At 208, method 200 comprises determining whether barometric pressure is greater than a minimum barometric pressure and less than a maximum barometric pressure. Barometric pressure may be assessed based on input from pressure sensor 110, for example. If the barometric pressure is not greater than the minimum barometric pressure and less than the maximum barometric pressure (NO), NOS injection is disabled at 204. If the barometric pressure is greater than the minimum barometric pressure and less than the maximum barometric pressure (YES), method 200 proceeds to 210. The minimum barometric pressure may be a typical or average barometric pressure at 4000 ft, such as 87.5 kPa, and the maximum barometric pressure may be a typical or average barometric pressure at 14,000 ft, such as 60 kPa, for example.

At 210, method 200 comprises determining whether NOS pressure in a NOS reservoir is less than a maximum NOS reservoir pressure relative to barometric pressure. The pressure in NOS reservoir 118 may be assessed based on input from NOS reservoir sensor 128, for example. If the NOS pressure in the NOS reservoir is not less than the maximum NOS reservoir pressure relative to barometric pressure (NO), NOS injection is disabled at 204. If the NOS pressure in the NOS reservoir is less than the maximum NOS reservoir pressure relative to barometric pressure (YES), method 200 proceeds to 212. The maximum NOS reservoir pressure may be 350 psi relative to barometric pressure, for example.

At 212, method 200 comprises determining whether engine speed is greater than a minimum engine speed and less than a maximum engine speed. The speed of engine 100 may be assessed based on input from engine speed sensor 126, for example. If the engine speed is not greater than the minimum engine speed and less than the maximum engine speed (NO), NOS injection is disabled at 204. If the engine speed is greater than the minimum engine speed and less than the maximum engine speed (YES), method 200 proceeds to 214. The minimum engine speed may be 6500 RPM and the maximum engine speed may be 10,500 RPM, for example.

At 214, method 200 comprises whether the throttle position of an intake throttle is greater than a minimum throttle position. If the throttle position is not greater than the minimum throttle position (NO), NOS injection is disabled at 204. If the throttle position is greater than the minimum throttle position (YES), method 200 proceeds to 216. The minimum throttle position may be greater than 70% open, for example.

At 216, method 200 comprises enabling a NOS control relay. Enabling the NOS control relay may include actuating one or more components (e.g., opening a solenoid valve) to enable NOS injection.

At 218, method 200 comprises performing a fuel/ignition timing table switch. At "POSITION 0", the NOS control relay is disabled and a first fuel/ignition timing table is used that provides timings for engine operation in which NOS injection is disallowed. As such, method 200 comprises, following disabling NOS injection at 204, using the first fuel/ignition timing table at 220. At "POSITION 1", a second fuel/ignition timing table is used that provides timings for engine operation in NOS injection is allowed. As such, method 200 comprises, at 222, using the second fuel/ignition timing table.

At 224, method 200 comprises performing NOS fuel compensation, which may include adjusting injection of a nominal or design fuel according to (e.g., in proportion to) the amount of NOS injected. The adjustment of the design fuel may be specified by the second fuel/ignition timing table, for example. The design fuel may be drawn from fuel reservoir 116, for example. NOS fuel compensation may include assessing NOS reservoir pressure and/or a Base Fuel Table (BFUELT), for example.

At 226, method 200 comprises determining whether a NOS off condition has occurred. Determining whether the NOS off condition has occurred may include determining whether one or more of the above conditions evaluated at 202, 206, 208, 210, 212, and/or 214 are no longer satisfied. If the NOS off condition has not occurred (NO), NOS injection control continues, as generally indicated at 228. If the NOS off condition has occurred (YES), method 200 proceeds to 230 where the NOS control relay is disabled, and then to 232 where the second fuel/ignition timing table is exited after a timer has expired. Upon expiration of the timer, method 200 returns to 220 where the first fuel/ignition timing table is used.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system, comprising:
   an internal combustion engine configured to run on a design fuel;
   a fuel system including:
      a fuel reservoir configured to store the design fuel; and
      a nitrous oxide (NOS) reservoir configured to store NOS;
   an engine control unit configured by a manufacturer of the engine control unit to selectively cause injection of the NOS into the internal combustion engine responsive to identifying, based on two or more sensor inputs, an operating condition in which NOS injection is permitted, to thereby boost output of the internal combustion engine;
   wherein the ECU uses a first fuel/ignition timing table for an operating condition in which a NOS injection is disabled, and uses a second fuel/ignition timing table for the operating condition in which NOS injection is permitted;
   wherein the engine control unit is further configured to identify a NOS off condition, and responsive to identifying the NOS off condition, exit the second fuel/ignition timing table following expiration of a timer and return to the first fuel/ignition timing table.

2. The system of claim 1, wherein
   the NOS reservoir is one of a plurality of components of a NOS injection system,
   the NOS injection system is an aftermarket part, and
   the engine control unit is a non-aftermarket part.

3. The system of claim 1, wherein the fuel system further includes a solenoid valve, and wherein the engine control unit is further configured to cause injection of the NOS by causing actuation of the solenoid valve.

4. The system of claim 1, further comprising a switch operatively coupled to the engine control unit, wherein the engine control unit is further configured to selectively cause injection of the NOS further responsive to closing of the switch, and to disable injection of the NOS responsive to opening of the switch, the switch being operatively coupled to a mechanism that is manually actuatable by a vehicle operator to open or close the switch.

5. The system of claim 1, wherein the second fuel/ignition timing table specifies an amount of the design fuel for injection that adapts to a variable amount of the NOS drawn from the NOS reservoir.

6. The system of claim 1, wherein the two or more sensor inputs include a temperature of the internal combustion engine sensed by a temperature sensor, and wherein the operating condition includes the temperature being greater than a minimum temperature and less than a maximum temperature.

7. The system of claim 1, further comprising a transmission, wherein the two or more sensor inputs include an operational gear ratio of the transmission sensed by a gear sensor, and wherein the operating condition includes one or both of the operational gear ratio being greater than a minimum gear ratio and less than a maximum gear ratio.

8. The system of claim 1, wherein the two or more sensor inputs include a speed of the internal combustion engine sensed by an engine speed sensor, and wherein the operating condition includes the speed being greater than a minimum engine speed and less than a maximum engine speed.

9. The system of claim 1, further comprising:
   an intake passage pneumatically coupled to the internal combustion engine; and an intake throttle arranged in the intake passage and having an internal throttle position sensor,
wherein the two or more sensor inputs include a throttle position of the intake throttle sensed by the throttle position sensor, and wherein the operating condition includes the throttle position being greater than a minimum throttle position.

10. A system, comprising:
an internal combustion engine configured to run on a design fuel;
a nitrous oxide (NOS) injection system including a NOS reservoir configured to store NOS;
a fuel reservoir configured to store the design fuel; and
an engine control unit configured by a manufacturer of the engine control unit to:
  receive a plurality of sensor inputs;
  identify, based on two or more of the sensor inputs, an operating condition in which NOS injection is permitted; and
  responsive to identifying the operating condition in which NOS injection is permitted, cause injection of the NOS into the internal combustion engine to thereby boost output of the internal combustion engine,
wherein the two or more sensor inputs include two or more of a barometric pressure, a pressure of the NOS reservoir, a speed of the internal combustion engine, and a temperature of the internal combustion engine;
wherein the operating condition includes:
  the temperature being greater than a minimum temperature and less than a maximum temperature,
  the pressure in the NOS reservoir being less than a maximum pressure in the NOS reservoir relative to the barometric pressure, and
  the speed being greater than a minimum engine speed and less than a maximum engine speed.

11. The system of claim 10, wherein the NOS injection system is an aftermarket part, and the engine control unit is a non-aftermarket part.

12. The system of claim 10, further comprising a switch operatively coupled to the engine control unit, wherein the engine control unit is further configured to cause injection of the NOS further responsive to closing of the switch, and to disable injection of the NOS responsive to opening of the switch, the switch being operatively coupled to a mechanism that is manually actuatable by a vehicle operator to open or close the switch.

13. The system of claim 10, further comprising:
an intake passage pneumatically coupled to the internal combustion engine;
an intake throttle arranged in the intake passage and having an internal throttle position sensor;
a transmission; and
a gear sensor,
wherein the two or more sensor inputs further include a throttle position of the intake throttle sensed by the throttle position sensor, and an operational gear ratio of the transmission sensed by the gear sensor, and
wherein the operating condition includes:
  the throttle position being greater than a minimum throttle position, and
  the operational gear ratio being greater than a minimum gear ratio and less than a maximum gear ratio.

14. An engine control unit, comprising:
a logic machine; and
a storage machine holding instructions executable by the logic machine to selectively enable nitrous oxide (NOS) injection from a NOS reservoir of a NOS injection system into an engine based on engine temperature, operational transmission gear ratio, barometric pressure, NOS reservoir pressure, engine speed, and intake throttle position,
wherein the NOS injection system is an aftermarket part, and
wherein the instructions are installed on the engine control unit by a manufacturer of the engine control unit;
wherein the instructions are executable to enable NOS injection responsive to:
the temperature being greater than within 10% of 60 degrees Celsius and less than within 10% of 90 degrees Celsius,
the operational transmission gear ratio being greater than a first gear and less than an upper gear,
the NOS reservoir pressure being less than between 0 and within 10% of 350 psi relative to the barometric pressure,
the barometric pressure being greater than within 10% of 87.5 kPA for an elevation within 10% of 4000 feet,
the engine speed being greater than within 10% of 6500 RPM and less than within 10% of 10,500 RPM, and
the intake throttle position being greater than within 10% of 70% fully open.

15. A system, comprising:
an internal combustion engine configured to run on a design fuel;
a fuel system including:
  a fuel reservoir configured to store the design fuel; and
  a nitrous oxide (NOS) reservoir configured to store NOS;
an engine control unit configured by a manufacturer of the engine control unit to selectively cause injection of the NOS into the internal combustion engine responsive to identifying, based on two or more sensor inputs, an operating condition in which NOS injection is permitted, to thereby boost output of the internal combustion engine;
a NOS reservoir sensor;
an intake passage pneumatically coupled to the internal combustion engine; and
a pressure sensor arranged in the intake passage,
wherein the two or more sensor inputs include a pressure in the NOS reservoir sensed by the NOS reservoir sensor and a barometric pressure sensed by the pressure sensor, and wherein the operating condition includes the pressure in the NOS reservoir being less than a maximum pressure in the NOS reservoir relative to the barometric pressure.

16. A system, comprising:
an internal combustion engine configured to run on a design fuel;
a fuel system including:
  a fuel reservoir configured to store the design fuel; and
  a nitrous oxide (NOS) reservoir configured to store NOS;
an engine control unit configured by a manufacturer of the engine control unit to selectively cause injection of the NOS into the internal combustion engine responsive to identifying, based on two or more sensor inputs, an operating condition in which NOS injection is permitted, to thereby boost output of the internal combustion engine;
an intake passage pneumatically coupled to the internal combustion engine; and
a pressure sensor arranged in the intake passage, wherein the two or more sensor inputs include a barometric pressure sensed by the pressure sensor, and wherein the engine control unit is further configured to throttle NOS injection as the barometric pressure increases.

* * * * *